(12) United States Patent
Garcia

(10) Patent No.: US 7,234,380 B2
(45) Date of Patent: Jun. 26, 2007

(54) SIDE PRESSURE SPLITTER

(75) Inventor: Jaime E. Garcia, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 302 days.

(21) Appl. No.: 10/763,994

(22) Filed: Jan. 23, 2004

(65) Prior Publication Data

US 2006/0101962 A1    May 18, 2006

Related U.S. Application Data

(60) Provisional application No. 60/442,884, filed on Jan. 27, 2003.

(51) Int. Cl.
*B27G 19/02*    (2006.01)
*B26D 7/22*    (2006.01)

(52) U.S. Cl. .................. 83/102.1; 83/447; 83/448; 83/450; 83/544; 83/102; 83/105; 83/397; 83/477.2; 144/286.1; 144/287

(58) Field of Classification Search ............... 83/102.1, 83/651, 471.2, 490, 477.1, 477.2, 878, 397.1, 83/471.3, 393, 397, 589, 585, 522.17, 477.3, 83/478, 860, 820, 698.11, 472, 101, 102, 83/DIG. 1, 574, 1.3, 105, 447, 448, 450, 83/441–443, 468.7; 144/286.1, 204.4, 287; 408/710, 714; 409/134, 344
See application file for complete search history.

(56) References Cited

U.S. PATENT DOCUMENTS 615,833 A * 12/1898 Fisher ...................... 83/102.1
2,095,330 A * 10/1937 Hedgpeth .................. 83/102.1
2,530,867 A * 11/1950 Galanga .................... 83/102.1
3,566,934 A    3/1971 Thrasher ..................... 143/167
3,583,450 A    6/1971 Gunnerman ................ 143/157
4,418,597 A * 12/1983 Krusemark et al. .......... 83/478
4,615,247 A * 10/1986 Berkeley ................... 83/102.1
4,625,604 A * 12/1986 Handler et al. ............. 83/102.1
5,230,269 A *  7/1993 Shiotani et al. ............ 83/468.7
5,447,085 A    9/1995 Gochnauer ................. 83/102.1
6,170,370 B1   1/2001 Sommerville .............. 83/102.1
6,418,829 B1 *  7/2002 Pilchowski ................... 83/397
6,644,157 B2 * 11/2003 Huang ......................... 83/438
2001/0035081 A1* 11/2001 Sutton ....................... 83/102.1
2002/0096030 A1*  7/2002 Wang ........................ 83/477.1
2002/0174755 A1* 11/2002 Behne et al. .................. 83/446

* cited by examiner

*Primary Examiner*—Boyer D. Ashley
*Assistant Examiner*—Ghassem Alie
(74) *Attorney, Agent, or Firm*—Adan Ayala

(57) ABSTRACT

The present invention is directed to an apparatus for maintaining contact between a portion of a workpiece between a kerf intrusion device and an alignment fence. In an aspect of the present invention, a table saw is configured with a support having a support surface for accepting a saw blade extended through an aperture in the support to cut a workpiece. An alignment fence is adjustably coupled to the saw to allow for workpiece positioning with respect to the saw blade. A kerf intrusion device such as a back splitter is coupled to an arbor for rotating the saw blade. An side pressure splitter is further included on the intrusion device such that a portion of a workpiece disposed between the intrusion device and the alignment fence is directed into contact with the alignment fence.

15 Claims, 5 Drawing Sheets

SIDE PRESSURE SPLITTER

CROSS REFERENCE

The present application claims priority under 35 U.S.C. §119(e) to U.S. Provisional Patent Application Ser. No. 60/442,884, entitled: *Side Pressure Splitter*, filed on Jan. 27, 2003, which is hereby incorporated by reference in its entirety.

FIELD OF THE INVENTION

The present invention generally relates to the field of power tools and more particularly to a saw having a side pressure splitter for maintaining contact between a workpiece and an alignment fence.

BACKGROUND OF THE INVENTION

A table saw is usually at the heart of any woodshop. Often a table saw is the first woodworking tool purchased due to its versatility. Typically, a table saw is provided with a rip fence, or alignment fence which is orientated parallel with the saw blade. An alignment fence allows the user to accurately, and easily position a workpiece to insure an even, accurate cut.

One difficulty which may occur is the tendency for a workpiece to "wander", or move away from the alignment fence. For example, a novice user may not push the workpiece evenly, such as by slightly angling the workpiece against the front portion of an alignment attachment while cutting. In the previous example, this tendency may be magnified for larger workpieces such as when cutting a large piece of plywood. While experienced woodworkers posses the knowledge and the ability to avoid these types of problems, inexperienced woodworkers may become discouraged which may in-turn lead to user dissatisfaction with the device.

Therefore, it would be desirable to provide a side pressure splitter for directing a workpiece into contact with an alignment fence.

SUMMARY OF THE INVENTION

Accordingly, the present invention is directed generally to a saw including a side pressure splitter for maintaining contact between a workpiece and an alignment fence.

In an aspect of the present invention, a table saw is configured with a support having a support surface for accepting a saw blade extended through an aperture in the support to cut a workpiece. An alignment fence is adjustably coupled to the saw to allow for workpiece positioning with respect to the saw blade. A kerf intrusion device such as a back splitter is coupled to an arbor for rotating the saw blade. A side pressure splitter is included on the intrusion device such that a portion of a workpiece disposed between the intrusion device and the alignment fence is directed into contact with the alignment fence.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings. Those of skill in the art will appreciate that the apparatus of the present invention may be implemented with various saws such as a cabinet table saw, a band saw, panel cutting saws, and the like without departing from the spirit and scope of the present invention.

Figure 1A:
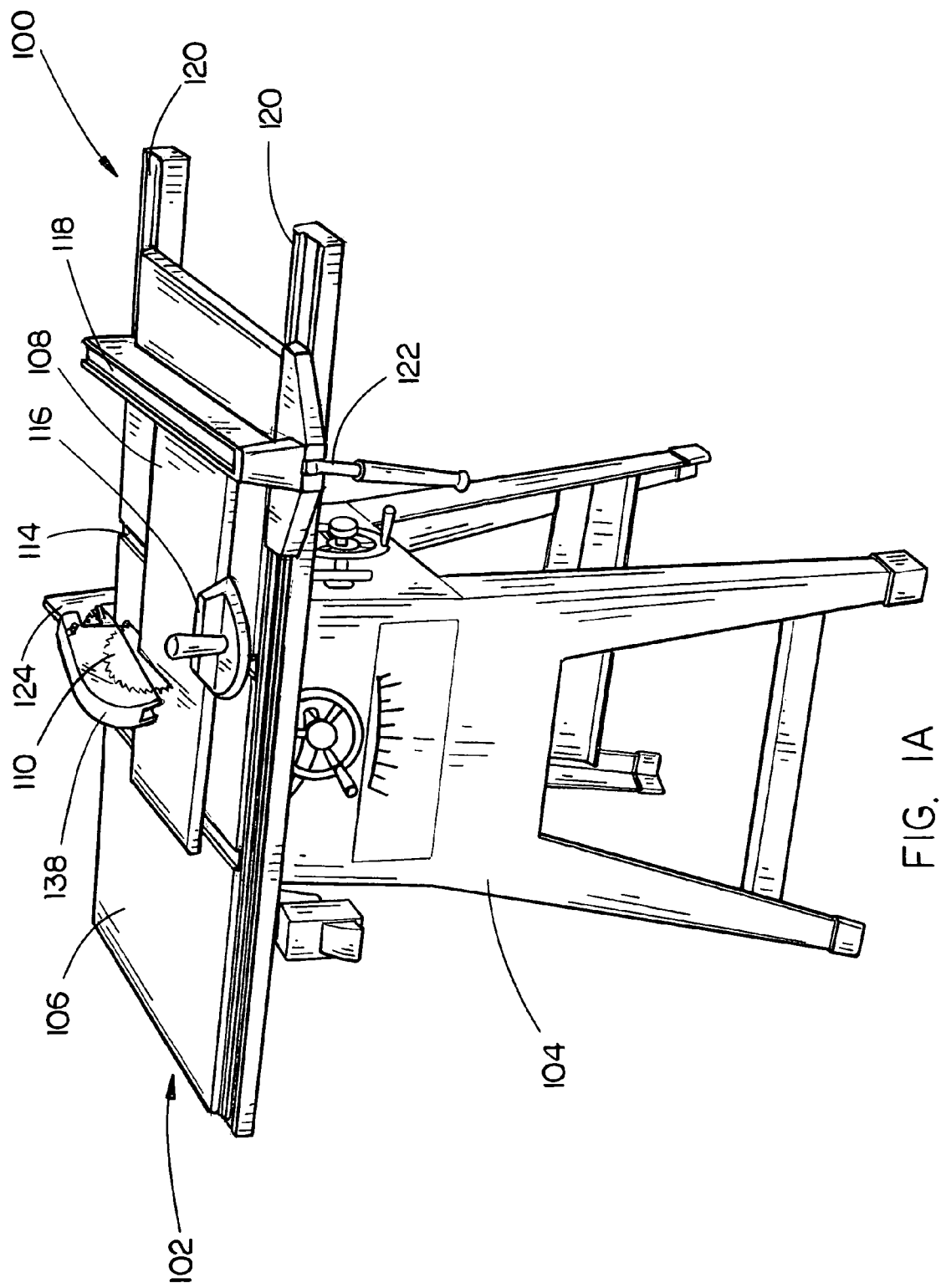
FIG. 1A is a perspective view of a table saw including a blade guard and a side pressure splitter in accordance with an aspect of the present invention.
Figure 1B:
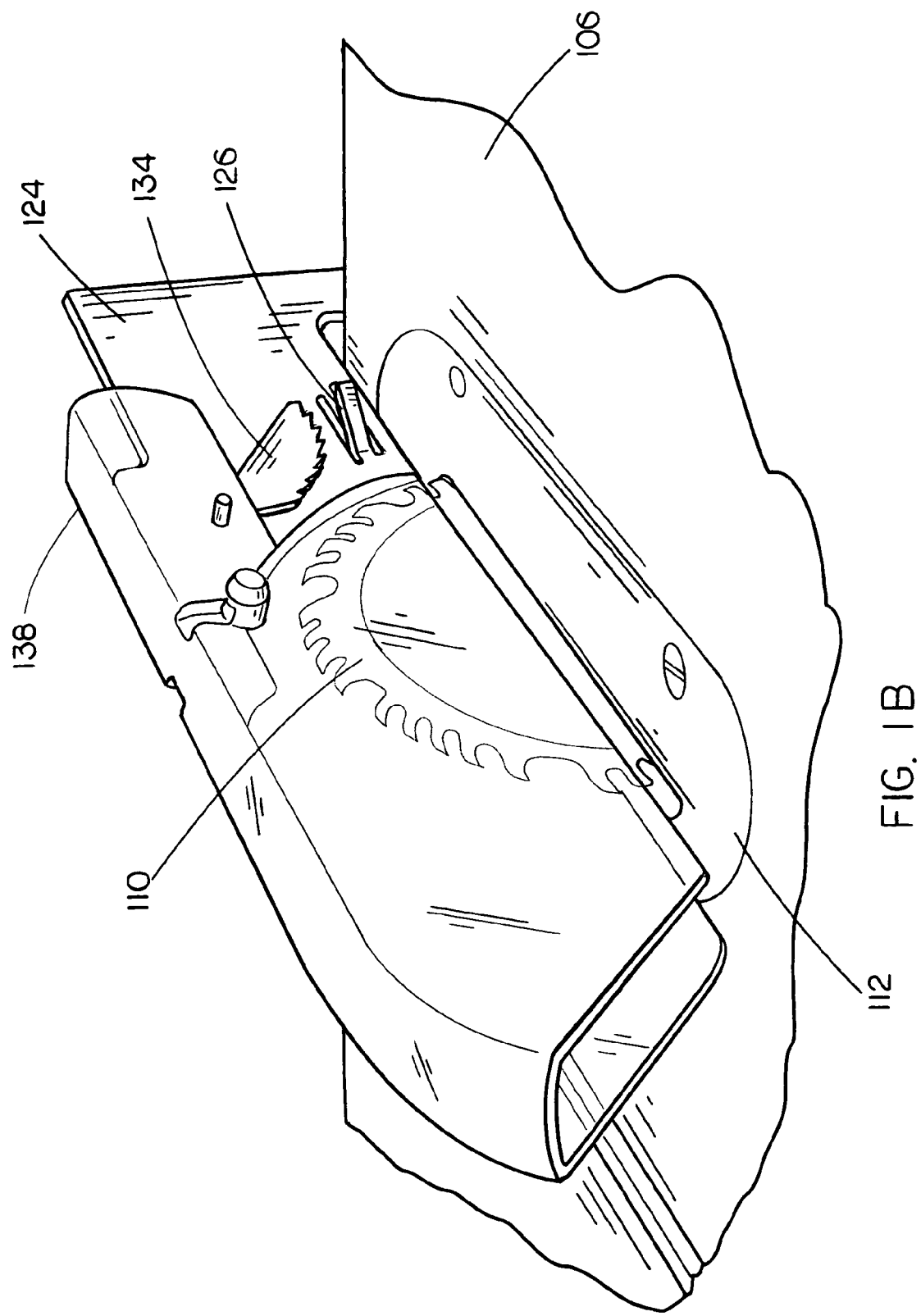
FIG. 1B is an enlarged cut-away view of FIG. 1A.

Referring to FIGS. 1A and 1B, a table saw 100 in accordance with an aspect of the present invention is disclosed. In the present embodiment, the saw 100 is an open cabinet type saw wherein the saw motor is mounted outside and to the rear of the base 104, or enclosure (as may be generally observed in FIG. 1). A support 102 having a support surface 106 configured for supporting, or positioning a workpiece 108 thereon, is included in the table saw 100. For example, a cast iron support may be included adjacent the saw blade to reduce vibration, provide a flat support surface, and the like. In additional examples, a side pressure splitter for accepting a large dimension workpiece may be included. For instance, a laminate wing is included to allow for increased supporting area, such as for cutting a piece of plywood.

A circular saw blade 110 extends through an aperture in the support 102 for cutting a workpiece. The saw blade 110 is mounted to an arbor for rotating the blade. The arbor may be mounted underneath the support such as directly to a side of the support opposite the workpiece support surface, connected to a base/cabinet, or the like as desired. Accordingly, various assemblies may be utilized for saw blade height adjustment, rotating the arbor, providing beveling capability (tilting of the saw blade with respect to the support surface), and the like. Preferably a removable throat plate 112 is included for supporting a workpiece adjacent the blade 110 while permitting access to the saw arbor to allow for blade changes such as for switching from a cutting blade to a dado blade, and the like. Additionally, the support 102 may include additional features such as a recessed slot 114 for receiving sliding miter gage 116, a sliding panel table attachment, and the like.

In the current embodiment, an alignment fence 118 is mounted to the support 102. For example, the alignment fence 118 may be slideably mounted on a pair of opposing rails 120 positioned, respectively, on the front and back of the support (e.g., with respect to the rotation of the saw blade), such that the rails 120 are generally perpendicular to the portion of the saw blade 110 extending beyond the support surface 106, thereby aligning the fence 118 substantially parallel to the saw blade 110. In additional embodiments, the fence/rails may be mounted to various saw components, such as the base/cabinet. During use, a user may position the alignment fence 118 by sliding the fence along the rails to the selected position and then securing a clamp-type locking mechanism 122, included on the fence 118, thereby locking the fence in-place with respect to the saw blade 110.

With continued reference to FIGS. 1A and 1B, a kerf intrusion device is coupled to the arbor so as to be disposed in the kerf, or channel formed in a workpiece by operation of the saw blade. For instance, a back splitter 124 may be coupled to the arbor/arbor mounting bracket in order for the splitter to bevel with the saw blade 110. Other suitable kerf intrusion devices include riving knives (a splitter, or blade disposed adjacent the trailing portion of the blade (opposite the cutting interface or cutting zone, wherein the blade initially contacts a workpiece)), back splitters (mounted adjacent to the edge of the support surface 106), and the like disposed in the kerf for preventing a workpiece from binding the saw blade. For example, a riving knife may be slightly curved so as to generally follow the curve of the saw blade 110, and thereby closely follow the blade. Moreover, a riving knife may be linked with the arbor/arbor mountings to adjust with the blade height. For instance, a riving knife may be mounted to the arbor mounting bracket in order for the knife to raise/lower with the saw blade. As may be best seen in FIG. 2, a back splitter may be formed with a bracket which extends to the arbor/arbor mounting located under the support to the rear of the support. The back splitter generally forms a plate, sized to fit in the kerf of the blade in order to prevent the portions of the workpiece, forming the furcation, from pinching the blade.

Figure 4:
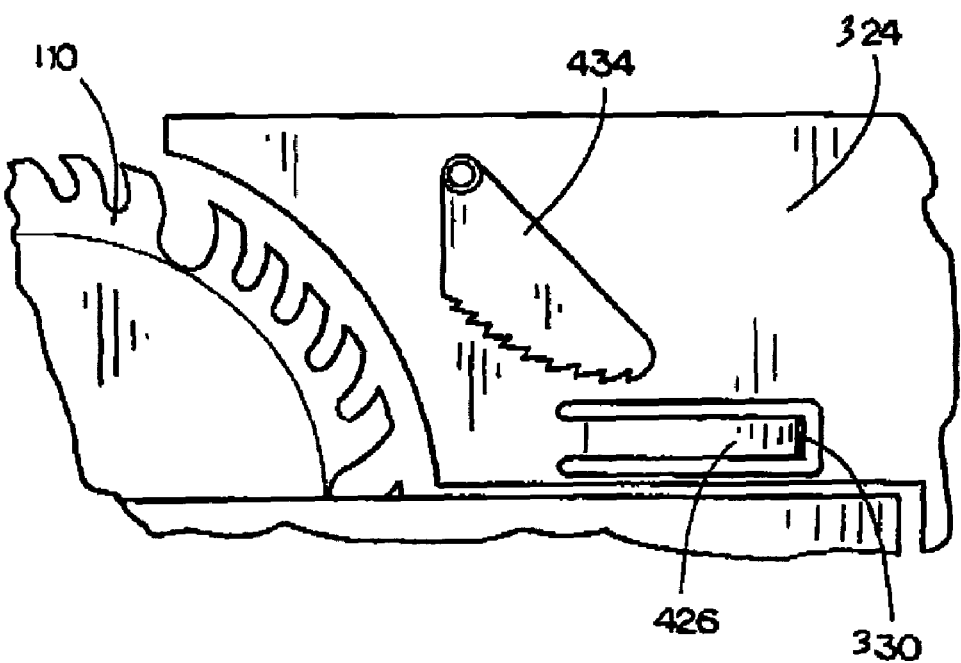
FIG. 4 is a side view of a blade guard including a side pressure splitter.

Referring to FIG. 1B. back splitter 124 may have at least one anti-kickback pawl 134. In addition a side pressure splitter is included on the back splitter 124. In further embodiments, a side pressure splitter may be included on a riving knife, or other kerf intrusion devices in a similar manner. In the present case, the side pressure splitter is unitarily formed with the back splitter as a tab 126 extending generally from a plane encompassing the back splitter 124. For example, a tab 426 may be cut into the backsplitter and bet to extend outwards from the general plane of the splitter, as indicated in FIG. 4. In further embodiments, a side pressure splitter may be connected generally along a side to the kerf intrusion device such as along an edge proximal to the saw blade such that a workpiece smoothly engages with the side pressure splitter. Preferably, the side pressure splitter is disposed adjacent the workpiece support surface 106 such that the side pressure splitter is at least partially positioned in the kerf for the expected range of workpiece thicknesses expected. In further instances, a side pressure splitter may be connected via a mechanical connection such as a key/keyhole configuration, connected via a fastener such as a rivet 332, a screw, or the like. For example, a side pressure splitter may be formed as a bowed strip (configured to act as a leaf spring) secured on a first and second end via rivets. Additionally, a side pressure splitter may be generally configured for easy removal, allow a user to switch the side pressure splitter to the opposite side of the main splitter should the fence be positioned on the opposite side of the blade.

Figure 3:
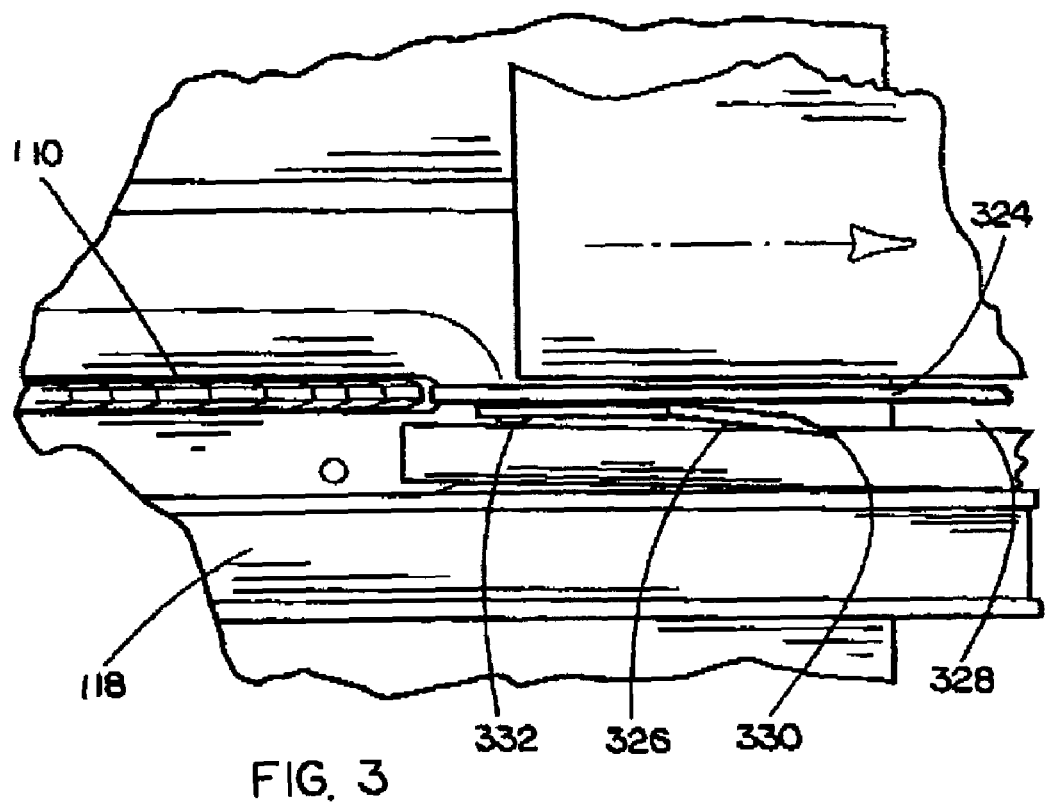
FIG. 3 is a top plan view of a blade guard including a side pressure splitter engaging a portion of a workpiece.

With reference to FIGS. 3 and 4, where like numerals refer to like parts, in an additional aspect, a side pressure splitter 326 is formed on a splitter 324 with a toothed or angled trailing edge 330 so as to minimize or prevent a workpiece from traveling backwards or towards the saw blade such as if the workpiece were to bind or closing downstream gap 328. Alternatively, or in conjunction, a friction coating may be included on the trailing edge so as to prevent the workpiece from traveling backwards toward the blade. Furthermore, an anti-kickback device may be configured so as to engage a workpeice in conjunction with the side pressure splitter. For example, a pivoting anti-kickback pawl 434 is configured to engage a workpiece biased by the tab 426. Additionally, the anti-kickback pawl may be configured to engage if the workplace should move away from the support surface such as if the workpiece begins to "lift-up".

Referring now to FIGS. 1A and 1B, a blade guard 138 may be included on the table saw 100. For example a pivoting blade guard 138 may be mounted to the back splitter 124. Suitable guards may be coupled via various linkages to a kerf intrusion device or may extend as an over arm guard coupled remotely to the saw support or the like.

Figure 2:
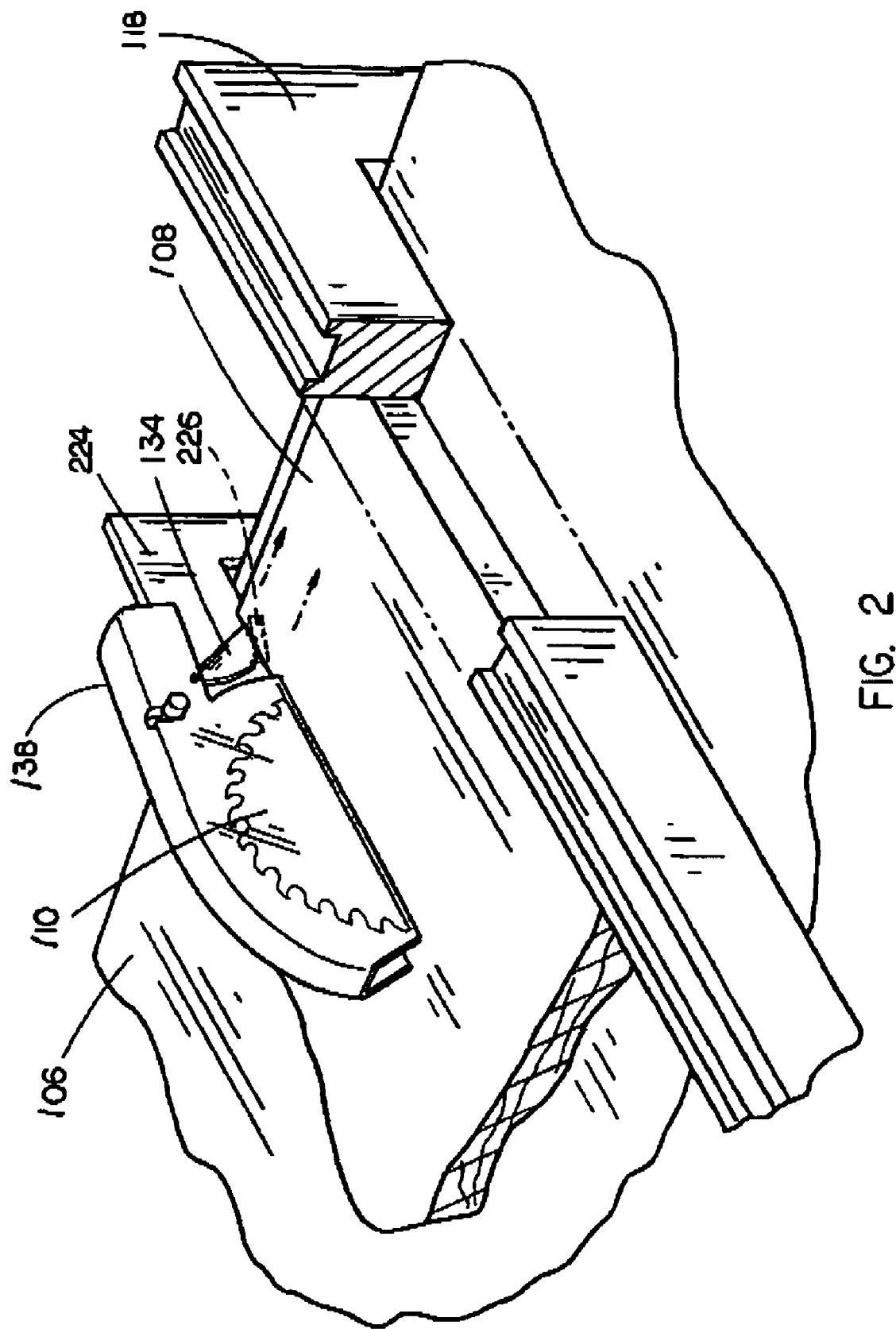
FIG. 2 is a perspective view of a table saw including a side pressure splitter wherein the side splitter generally forces a portion of the workpiece toward an alignment fence.
Figure 5:
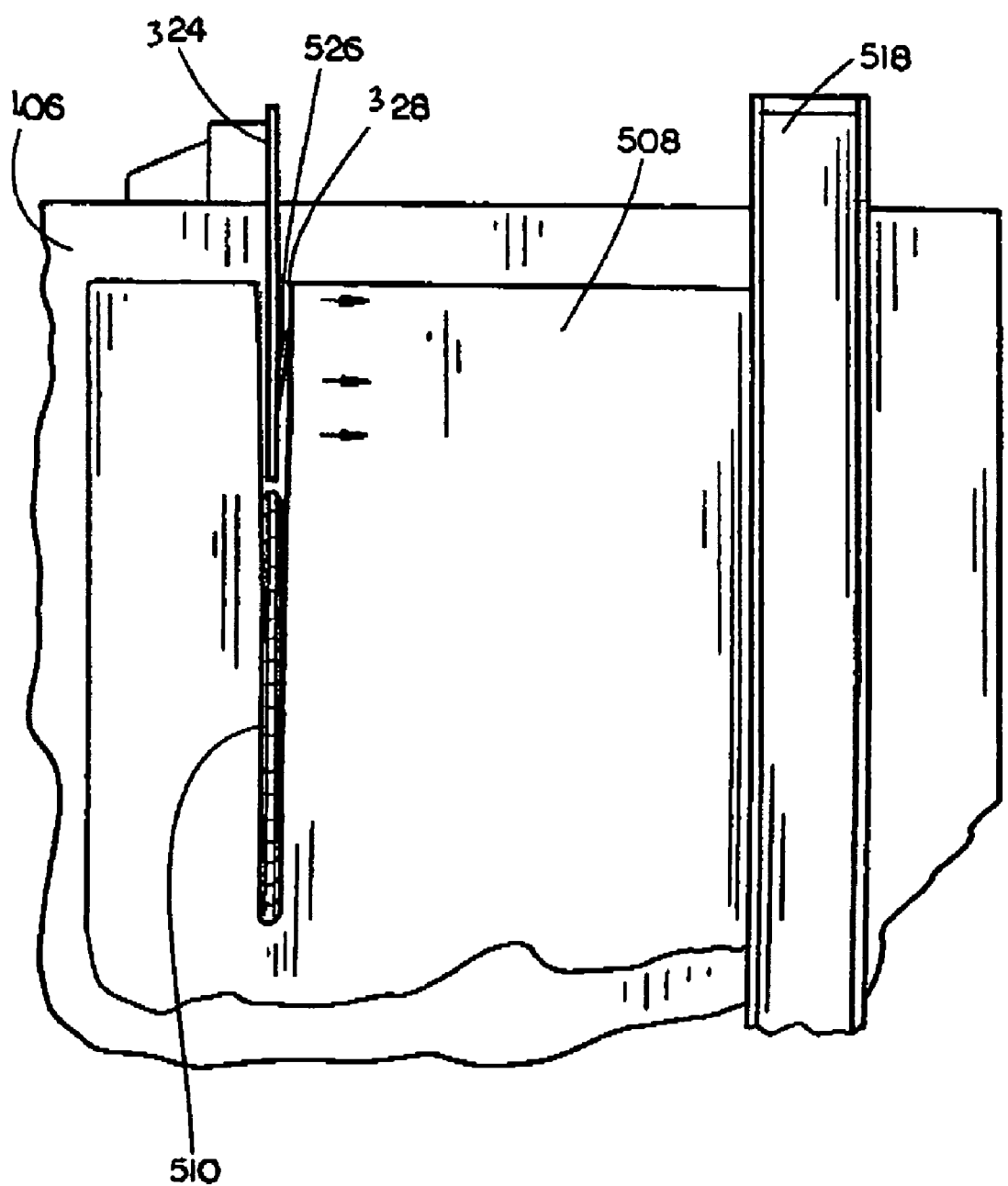
FIG. 5 is a top plan view of a blade guard including a side pressure splitter engaging a portion of a workpiece.

With reference to FIG. 2, where like numerals refer to like parts. preferably, a side pressure splitter, included on a kerf intrusion device 224. such as a tab side pressure splitter 226 is orientated toward an alignment fence 118 in order to generally force or direct the portion of the workpiece 108 between the saw blade 110 and the fence 118 into contact with the fence. Preferably, the side pressure splitter directs the workpiece substantially perpendicular to the saw in order for the workpiece to follow a substantially parallel path to the saw blade. For example, the tab 226 may generally bias or exert a spring force on the workpiece 108 to insure contact between the workpiece 108 and the fence 118 so as to promote an accurate, even cut Further, the side pressure splitter may act or tend to resist the workpiece from angling away from a fence. Thus, a table saw employing the system of the present invention may tend to, at least partially, resist an angling of the workpiece away from the alignment. If for example, a bowed strip is utilized the strip may be connected on the side of a kerf intrusion device directed towards the fence. In the previous example, the bowed strip may be configured to allow for a range of force to be applied. For instance, a slot may allow for the strip side splitter to extend/retract towards a back splitter as the workpiece initially contacts the side pressure splitter. Further, at the end of the slot the strip may be resiliently positioned against a rivet or the like such that the strip is forced to bow towards the kerf intrusion device, thereby defining the maximum force which may be applied against the workpiece. With reference to FIG. 5. where like numerals refer to like parts, preferably, a side pressure splitter, included on a kerf intrusion device such as a tab side pressure splitter 526 is orientated toward an alignment fence 518 in order to generally force or direct the portion of the workpiece between the saw blade 510 and the fence 518 into contact with the fence. Preferably, the side pressure splitter directs the workpiece substantially perpendicular to the saw in order for the workpiece to follow a substantially parallel path to the saw blade. For example, the tab 526 may generally bias or exert a spring force on the workpiece 508 to insure contact between the workpiece 508 and the fence 518 so as to promote an accurate. even cut. Further, the side pressure splitter may act or tend to resist the workpiece from angling away from a fence. Thus, a table saw employing the system of the present invention may tend to, at least partially, resist an angling of the workpiece away from the alignment. If, for example, a bowed strip is utilized the strip maybe connected on the side of a kerf intrusion device directed towards the fence. In the previous example, the bowed strip may be configured to allow for a range of force to be applied. For instance, a slot may allow for the strip side splitter to extend/retract towards a back splitter as the workpiece initially contacts the side pressure splitter. Further, at the end of the slot the strip may be resiliently positioned against a rivet or the like such that the strip is forced to bow towards the kerf intrusion device. thereby defining the maximum force which may be applied against the workpiece.

It is believed that the apparatus of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A table saw, comprising:
   a support including an aperture for extending a circular saw blade therethrough, the support including a workpiece support surface for supporting a workpiece to be cut;
   an alignment fence adjustably mounted to the table saw, said alignment fence being configured for positioning the workpiece to be cut with respect to the circular saw blade;
   an arbor mounted to the table saw generally opposite the workpiece support surface, said arbor being arranged for adjustably supporting the circular saw blade; and
   a kerf intrusion device coupled to the arbor such that the kerf intrusion device is disposed in the kerf formed in a workpiece by operation of the circular saw blade, said kerf intrusion device including a body, a guard attached to the body for partially covering a periphery of the circular saw blade, a first anti-kickback pawl coupled to the body, and a side pressure splitter disposed on the body below the first pawl and at least partially positioned in the kerf formed in the workpiece by operation of the circular saw blade, the side pressure splitter being directed towards the alignment fence and having a portion disposed downstream of the circular saw blade and the first pawl,
   wherein the kerf intrusion device side pressure splitter is orientated such that the side pressure splitter biases a portion of the workpiece being cut between the kerf intrusion device and the alignment fence into contact with the alignment fence.

2. The table saw claim 1 wherein a kerf intrusion device is at least one of a riving knife and a backsplitter.

3. The table saw of claim 1, wherein the side pressure splitter is a tab formed unitarily with the kerf intrusion device.

4. The table saw of claim 1, wherein the side pressure splitter is biased by a spring.

5. The table saw of claim 1, wherein the side pressure splitter includes a trailing edge configured to engage a workpiece to prevent the workpiece from traveling towards the circular saw blade.

6. The table saw of claim 1, wherein the side pressure splitter is a flexible strip having a first and a second end, the strip being at least partially connected to the kerf intrusion device proximate the first end and the second end so as to act as a leaf spring.

7. The table saw of claim 1, wherein the first anti-kickback pawl is formed to engage a workpiece being directed toward the alignment fence by the side pressure splitter, if the workpiece moves away from the workpiece support surface.

8. The table saw of claim 1, further comprising a pair of opposing rails mounted, substantially perpendicular to the portion of the circular saw blade extending through the support, on opposite sides of the support, the rails being constructed for slideably mounting the alignment fence thereto.

9. A table saw, comprising:
   a support including an aperture for extending a circular saw blade therethrough, the support including a workpiece support surface for supporting a workpiece to be cut;
   an alignment fence adjustably mounted to the table saw substantially parallel with the circular saw blade, said alignment fence being configured for positioning the workpiece to be cut with respect to the circular saw blade;
   a beveling arbor mounted to the table saw generally opposite the workpiece support surface, said arbor being arranged for adjustably supporting the circular saw blade; and
   a back splitter coupled to the arbor whereby the back splitter bevels with the arbor so that the back splitter is disposed in the kerf formed in a workpiece by operation of the circular saw blade, said back splitter including a body, a guard attached to the body for partially covering a periphery of the circular saw blade, a first anti-kickback pawl coupled to the body, and a side pressure splitter disposed on the body below the first pawl and at least partially positioned in the kerf formed in the workpiece by operation of the circular saw blade, the side pressure splitter being directed towards the alignment fence and having a portion disposed downstream of the circular saw blade and the first pawl,
   wherein the side pressure splitter is orientated such that the side pressure splitter biases a portion of the workpiece between the back splitter and the alignment fence into contact with the alignment fence.

10. The table saw of claim 9, wherein the side pressure splitter is a tab formed unitarily with the back splitter.

11. The table saw of claim 9, wherein the side pressure splitter is biased by a spring.

12. The table saw of claim 9. wherein the side pressure splitter includes a trailing edge configured to engage a workpiece to prevent the workpiece from traveling towards the circular saw blade.

13. The table saw of claim 9, wherein the side pressure splitter is a flexible strip having a first and a second end, the strip being at least partially connected to the back splitter proximate the first end and the second end so as to act as a leaf spring.

14. The table saw of claim 9, wherein the first anti-kickback pawl is formed to engage a workpiece being directed toward the alignment fence by the side pressure splitter, if the workpiece moves away from the workpiece support surface.

15. The table saw of claim 9, further comprising a pair of opposing rails mounted, substantially perpendicular to the portion of the circular saw blade extending through the support, on opposite sides of the support, the rails being constructed for slideably mounting the alignment fence thereto.

* * * * *